UNITED STATES PATENT OFFICE.

MARIS CHAMBERS, OF BENTIVOGLIO, VIRGINIA.

IMPROVEMENT IN TOBACCO-FLAVORING.

Specification forming part of Letters Patent No. 207,106, dated August 20, 1878; application filed June 7, 1878.

*To all whom it may concern:*

Be it known that I, MARIS CHAMBERS, of Bentivoglio, in the county of Albemarle and State of Virginia, have invented certain new and useful Improvements in Tobacco-Flavoring; and I do hereby declare that the following is a full, clear, and exact description thereof, which will enable others skilled in the art to which it appertains to make and use the same.

My invention consists in an improvement on the method of flavoring chewing-tobacco described in my patent of December 9, 1876, No. 185,389.

In the method therein described, I made use of fruits in the ordinary condition of dryness in which they are found in the market under the designation of "dried fruits." These I reduced to shreds or small pieces by any suitable mechanical process, and mixed them with the tobacco prior to its manufacture into plugs for chewing, in the ordinary manner. The fruit shredded and comminuted in the manner described in that patent still retained a considerable amount of moisture, and formed a pasty and sticky mass, in some respects objectionable.

I have found by practical experience that after roasting the dried fruit in the same manner that coffee is roasted, I am enabled to produce, by grinding the roasted fruit, a dry powder which answers admirably the purposes of flavoring, and is much more convenient in manipulation than the fruit prepared by my former process. This constitutes my present improvement.

I take the ordinary dried fruit of commerce and expose it to artificial heat in any convenient form of roaster—such, for example, as that commonly employed in the roasting of coffee—and having by this treatment expelled all its moisture, I grind it in a mill to a powder. This powder is mingled with the tobacco before pressing, in any convenient way, and imparts to it the peculiar flavor of the particular fruit employed, forming a palatable chewing-plug, either with or without the addition of sugar, licorice, or other sweetening. The fruit supplies all necessary gum.

I find that the fruits grind better by allowing them to stand a short time to harden before passing them through the mill.

In addition to the fruits named in my prior patent, apples may be mentioned as peculiarly suited to this method of treatment.

I claim—

A dry flavoring for chewing-tobacco, formed by roasting dried fruits and reducing them to a powder by grinding, in the manner described.

In testimony that I claim the foregoing as my own invention I affix hereto my signature in presence of two witnesses.

MARIS CHAMBERS.

Witnesses:
JOHN T. GODDIN,
H. C. CABELL.